United States Patent
Matsui et al.

(10) Patent No.: US 11,132,332 B2
(45) Date of Patent: Sep. 28, 2021

(54) METHOD TO WRITE DATA AHEAD TO SNAPSHOT AREA TO AVOID COPY-ON-WRITE

(71) Applicant: International Business Machines Corporation, Armonk, NY (US)

(72) Inventors: Sosuke Matsui, Tokyo (JP); Tohru Hasegawa, Tokyo (JP); Noriko Yamamoto, Tokyo (JP); Shinsuke Mitsuma, Machida (JP); Hiroshi Itagaki, Yokohama (JP); Tsuyoshi Miyamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 16/179,725

(22) Filed: Nov. 2, 2018

(65) Prior Publication Data

US 2020/0142971 A1    May 7, 2020

(51) Int. Cl.
| | |
|---|---|
| *G06F 7/00* | (2006.01) |
| *G06F 16/11* | (2019.01) |
| *G06F 11/14* | (2006.01) |
| *G06F 3/06* | (2006.01) |

(52) U.S. Cl.
CPC ............ *G06F 16/128* (2019.01); *G06F 3/067* (2013.01); *G06F 3/0626* (2013.01); *G06F 3/0655* (2013.01); *G06F 11/1458* (2013.01); *G06F 2201/84* (2013.01)

(58) Field of Classification Search
CPC ...... G06F 16/10; G06F 16/128; G06F 16/215; G06F 16/185; G06F 16/245; G06F 16/2365; G06F 16/122
See application file for complete search history.

(56) References Cited

U.S. PATENT DOCUMENTS

| | | | | |
|---|---|---|---|---|
| 6,748,504 | B2 * | 6/2004 | Sawdon | G06F 3/067 711/162 |
| 7,200,686 | B2 * | 4/2007 | Chang | G06F 3/0611 710/39 |
| 7,328,226 | B1 | 2/2008 | Karr et al. | |
| 7,490,213 | B2 * | 2/2009 | Zohar | G06F 3/0605 711/173 |

(Continued)

FOREIGN PATENT DOCUMENTS

| | | |
|---|---|---|
| CN | 101840362 A | 9/2010 |
| JP | 2001306407 A | 11/2001 |
| WO | WO2013/16034 A1 * | 10/2013 |

OTHER PUBLICATIONS

Ma et al: "Volume: Enable Large-Scale In-Memory Computation on Commodity Clusters"; IEEE 2013.*

(Continued)

*Primary Examiner* — Daniel A Kuddus
(74) *Attorney, Agent, or Firm* — Kunzler Bean & Adamson (57) ABSTRACT

A method includes setting a maximum total size of data saved in a snapshot area, creating a snapshot of a file system, including reference to a plurality of logical volumes, saving at least a part of the plurality of logical volumes in the snapshot area on condition that it does not exceed the maximum total size of data saved in the snapshot area, and executing copy-on-write processing in response to a writing request for data in the file system, the data not being saved in the snapshot area.

20 Claims, 5 Drawing Sheets

(56) References Cited

U.S. PATENT DOCUMENTS

| | | | | |
|---|---|---|---|---|
| 7,549,029 B2* | 6/2009 | Zohar | G06F 3/0605 | 711/162 |
| 7,836,266 B2* | 11/2010 | Zohar | G06F 11/1458 | 711/162 |
| 7,904,425 B2* | 3/2011 | Cannon | G06F 11/1458 | 707/654 |
| 8,316,203 B2* | 11/2012 | Eguchi | G06F 11/1466 | 711/170 |
| 8,438,353 B1 | 5/2013 | Ramanathan et al. | | |
| 8,527,722 B1* | 9/2013 | Okada | G06F 12/0888 | 711/162 |
| 8,713,077 B2* | 4/2014 | Kazar | G06F 3/067 | 707/812 |
| 8,762,671 B2* | 6/2014 | Deguchi | G06F 3/065 | 711/162 |
| 8,949,187 B1* | 2/2015 | Satish | G06F 11/1461 | 707/640 |
| 8,972,681 B2* | 3/2015 | Jones | G06F 12/0246 | 711/165 |
| 9,170,751 B2 | 10/2015 | Kimmel | | |
| 2003/0140210 A1* | 7/2003 | Testardi | G06F 12/0292 | 711/203 |
| 2003/0159007 A1* | 8/2003 | Sawdon | G06F 11/1466 | 711/154 |
| 2003/0204691 A1* | 10/2003 | Chang | G06F 3/0611 | 711/163 |
| 2006/0123211 A1* | 6/2006 | Derk | G06F 11/1451 | 711/162 |
| 2006/0253681 A1* | 11/2006 | Zohar | G06F 12/00 | 711/172 |
| 2007/0067583 A1* | 3/2007 | Zohar | G06F 11/1458 | 711/162 |
| 2009/0198929 A1* | 8/2009 | Saika | G06F 21/805 | 711/162 |
| 2010/0131727 A1* | 5/2010 | Eguchi | G06F 11/1466 | 711/162 |
| 2013/0054534 A1* | 2/2013 | Eguchi | G06F 11/1466 | 707/649 |
| 2013/0219136 A1* | 8/2013 | Nakamura | G06F 3/0689 | 711/162 |
| 2014/0156956 A1* | 6/2014 | Ezra | G06F 3/065 | 711/162 |
| 2017/0083409 A1 | 3/2017 | Iwasaki et al. | | |
| 2017/0286019 A1* | 10/2017 | Takahashi | G06F 12/00 | |

OTHER PUBLICATIONS

Alan Redding, "Storage Magazine", published by JDSF (Japan Data Storage Forum), Data Management Solution Group, Oct. 2009, pp. 1-5.

* cited by examiner

METHOD TO WRITE DATA AHEAD TO SNAPSHOT AREA TO AVOID COPY-ON-WRITE

FIELD

The subject matter disclosed herein relates to systems and methods for transporting goods and people and more particularly relates to systems and methods to write data to a snapshot area to avoid copy-on-write.

BACKGROUND

A snapshot of a file system is a technology of acquiring a dormant or quiescent point of the file system at a high speed by creating a copy. A snapshot may be a read-only image that captures the state of the file system at a point in time. The snapshot may be used for a file system backup, a remote copy, a virus scan, and the like at a particular point in time.

BRIEF SUMMARY

A method is disclosed. The method includes setting a maximum total size of data saved in a snapshot area, creating a snapshot of a file system, including reference to a plurality of logical volumes, saving at least a part of the plurality of logical volumes in the snapshot area on condition that it does not exceed the maximum total size of data saved in the snapshot area, and executing copy-on-write processing in response to a writing request for data in the file system, the data not being saved in the snapshot area.

A method is disclosed. The method includes creating a snapshot of a file system, including reference to a plurality of logical volumes, saving at least a part of the plurality of logical volumes in the snapshot area in ascending order of size, and executing copy-on-write processing in response to a writing request for data in the file system, the data not being saved in the snapshot area.

A computer program product is disclosed, the computer program product including a computer-readable storage medium including program instructions embodied therewith, the program instructions executable by a processor to cause the processor to set a maximum total size of data saved in a snapshot area, create the snapshot of a file system, including reference to a plurality of logical volumes, save at least a part of the plurality of logical volumes in the snapshot area on condition that it does not exceed the maximum total size of data saved in the snapshot area, and execute copy-on-write processing in response to a writing request for data in the file system, the data not being saved in the snapshot area.

An apparatus is disclosed, the apparatus including a size module, a snapshot module, a save module, and a copy module. The size module sets a maximum total size of data saved in a snapshot area. The snapshot module creates the snapshot of a file system, including reference to a plurality of logical volumes. The save module saves at least a part of the plurality of logical volumes in the snapshot area on condition that it does not exceed the maximum total size of data saved in the snapshot area. The copy module executes copy-on-write processing in response to a writing request for data in the file system, the data not being saved in the snapshot area.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Disclosed herein are various embodiments providing methods, systems, and computer program products that can select locations on a storage device based on characterizations of adjacent location errors. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The present invention may be a system, a method, and/or a computer program product. The computer program product may include a computer readable storage medium (or media) having computer readable program instructions thereon for causing a processor to carry out aspects of the present invention.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The subject matter of the present application has been developed in response to the present state of the art, and in particular, in response to the problems and disadvantages associated with the present state of the art. Accordingly a method is disclosed, the method including setting a maximum total size of data saved in a snapshot area, creating a snapshot of a file system, including reference to a plurality of logical volumes, saving at least a part of the plurality of logical volumes in the snapshot area on condition that it does not exceed the maximum total size of data saved in the snapshot area, and executing copy-on-write processing in response to a writing request for data in the file system, the data not being saved in the snapshot area.

In some embodiments, the saving is executed asynchronously with the copy-on-write processing. In some embodiments, the saving is executed in units of logical volumes.

In some embodiments, the saving is performed by saving the logical volumes in ascending order of size in the snapshot area. In some embodiments, the copy-on-write processing is executed in units of data blocks.

In some embodiments, the copy-on-write processing is executed to one or more data blocks corresponding to target data of the writing request. In some embodiments, the plurality of logical volumes includes one or more virtual tapes that belong to a private category and one or more virtual tapes that belong to a scratch category.

In some embodiments, data is appended to the virtual tape that belongs to the private category, and wherein data is overwritten from the beginning of a file on the virtual tape that belongs to the scratch category.

Another method is disclosed, the method including creating a snapshot of a file system, including reference to a plurality of logical volumes, saving at least a part of the plurality of logical volumes in the snapshot area in ascending order of size, and executing copy-on-write processing in response to a writing request for data in the file system, the data not being saved in the snapshot area.

In some embodiments, the method further includes setting a maximum total size of data saved in a snapshot area. In some embodiments, the method further includes saving at least a part of the plurality of logical volumes in the snapshot area on condition that it does not exceed the maximum total size of data saved in the snapshot area. In some embodiments, the saving is executed asynchronously with the copy-on-write processing. In some embodiments, the saving is executed in units of logical volumes. In some embodiments, the copy-on-write processing is executed in units of data blocks. In some embodiments, the copy-on-write processing is executed to one or more data blocks corresponding to target data of the writing request.

A computer program product is disclosed, the computer program product including a computer-readable storage medium including program instructions embodied therewith, the program instructions executable by a processor to cause the processor to set a maximum total size of data saved in a snapshot area, create the snapshot of a file system, including reference to a plurality of logical volumes, save at least a part of the plurality of logical volumes in the snapshot area on condition that it does not exceed the maximum total size of data saved in the snapshot area, and execute copyon-write processing in response to a writing request for data in the file system, the data not being saved in the snapshot area.

In some embodiments, the saving is executed asynchronously with the copy-on-write processing. In some embodiments, the saving is performed by saving the logical volumes in ascending order of size in the snapshot area. In some embodiments, the plurality of logical volumes include one or more virtual tapes that belong to a private category and one or more virtual tapes that belong to a scratch category.

An apparatus is also disclosed, the apparatus including a size module, a snapshot module, a save module, and a copy module. The size module sets a maximum total size of data saved in a snapshot area. The snapshot module creates the snapshot of a file system, including reference to a plurality of logical volumes. The save module saves at least a part of the plurality of logical volumes in the snapshot area on condition that it does not exceed the maximum total size of data saved in the snapshot area. The copy module executes copy-on-write processing in response to a writing request for data in the file system, the data not being saved in the snapshot area.

In some embodiments, the saving is executed asynchronously with the copy-on-write processing. In some embodiments, the saving is executed in units of logical volumes.

In some embodiments, the saving is performed by saving the logical volumes in ascending order of size in the snapshot area. In some embodiments, the copy-on-write processing is executed in units of data blocks.

In some embodiments, the copy-on-write processing is executed to one or more data blocks corresponding to target data of the writing request. In some embodiments, the plurality of logical volumes includes one or more virtual tapes that belong to a private category and one or more virtual tapes that belong to a scratch category.

In some embodiments, data is appended to the virtual tape that belongs to the private category, and wherein data is overwritten from the beginning of a file on the virtual tape that belongs to the scratch category.

The description of elements in each figure may refer to elements of proceeding figures. Like numbers refer to like elements in all figures, including alternate embodiments of like elements.

Figure 1:
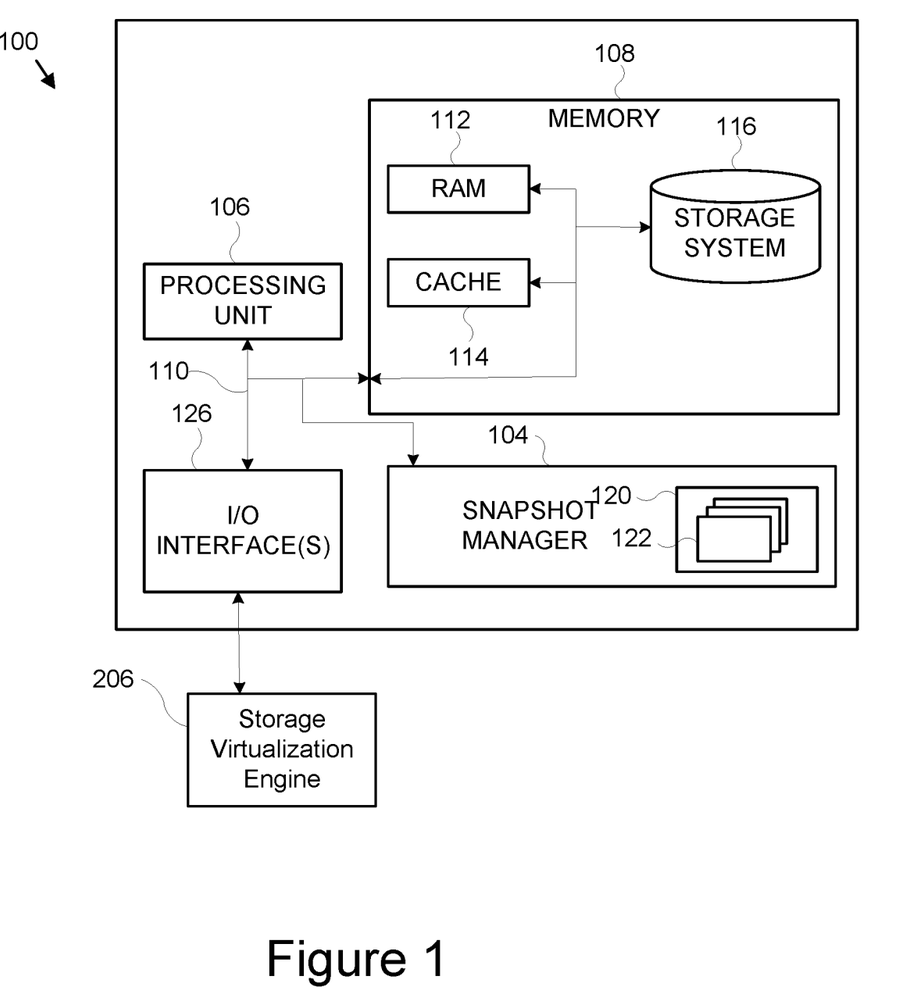
FIG. 1 is a schematic block diagram illustrating a system in accordance with one or more embodiments of the present invention.

With reference now to the figures, FIG. 1 shows an exemplary system 100 that is applicable to implement some embodiments of the present disclosure. System 100 is only illustrative and is not intended to suggest any limitation as to the scope of use or functionality of embodiments of the disclosure described herein. The components of computer system 100 may include, but are not limited to, a snapshot manager 104, one or more processors or processing units 106, a system memory 108, I/O interfaces 126, and a bus 110 that couples various system components including system memory 108 to processor 106.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 100 typically includes a variety of computer system readable media. Such media may be any available media that is accessible by computer system 100, and it includes both volatile and non-volatile media, removable and non-removable media.

System memory 108 can include computer system readable media in the form of volatile memory, such as random access memory (RAM) 112 and/or cache memory 114. Computer system 100 may further include other removable/non-removable, volatile/non-volatile computer system storage media. By way of example only, storage system 116 can be provided for reading from and writing to a storage media (not shown and typically called a "drive"). Although not shown, a magnetic disk drive for reading from and writing to a removable, non-volatile solid state drive, magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 110 by one or more data media interfaces. As will be further depicted and described below, snapshot manager 104 may include at least one program product having a set (e.g., at least one) of program modules 122 that are configured to carry out the functions of embodiments of the disclosure. In some embodiments, the program product 120 is stored on memory 108.

Program/utility 120, having a set (at least one) of program modules 122, may be stored in memory 108 by way of example, and not limitation, as well as an operating system, one or more application programs, other program modules, and program data. Each of the operating system, one or more application programs, other program modules, and program data, or some combination thereof, may include an implementation of a networking environment. Program modules 122 generally carry out the functions and/or methodologies of embodiments of the disclosure as described herein.

Computer system 100 may also communicate with one or more external devices such as a keyboard, a pointing device, a display, etc.; one or more devices that enable a user to interact with computer system 100; any devices (e.g., network card, modem, etc.) that enable computer system 100 to communicate with one or more other computing devices; and/or a storage virtualization controller 206. Such communication can occur via input/output (I/O) interfaces 126. Still yet, computer system 100 can communicate with one or more networks such as a local area network (LAN), a general wide area network (WAN), a storage area network (SAN), and/or a public network (e.g., the Internet) via network adapter. A network adapter communicates with the other components of the computer system 100 via bus 110. While not shown, other hardware and/or software components could be used in conjunction with computer system 100. Examples, include, but are not limited to, microcode, device drivers, redundant processing units, external disk drive arrays, RAID systems, tape drives, and data archival storage systems, etc.

In one embodiment, the computer system 100 is part of or is in communication with a network and a storage virtualization engine 206. Communication with other devices, apparatuses, or systems on the network may be handled by the I/O interfaces 126 or the network adapter as needed. In some embodiments, the computer system 100 includes various modules, described in greater detail below, to manage snapshot data and other data. In some embodiments, the computer system 100 manages read or write requests and processes performed by the storage virtualization engine 206 with respect to data areas and snapshot areas. In some embodiments, the computer system 100 independently or in conjunction with other systems or devices, manages data of logical volumes existing in a scratch category and a private category. Fewer or more than these functions and other functions may be accomplished wholly or in part by the computer system 100 or another embodiment of the computer system 100.

A snapshot of a file system is a technology of acquiring a dormant or quiescent point of the file system at a high speed by creating a copy. A snapshot may be a read-only image that captures the state of the file system at a point in time. The snapshot may be used for a file system backup, a remote copy, a virus scan, and the like at a particular point in time.

When an update request for a certain file arises after the snapshot of the file system is created, a data block to be updated is read from the file, the data is written to a snapshot area, and then copy-on-write processing is generated. Although the dormant or quiescent point of the file system can be created at the high speed by using the snapshot, there is a problem that when a certain file is updated, the data cannot be written efficiently because of a writing delay due to the copy-on-write processing.

Figure 2:
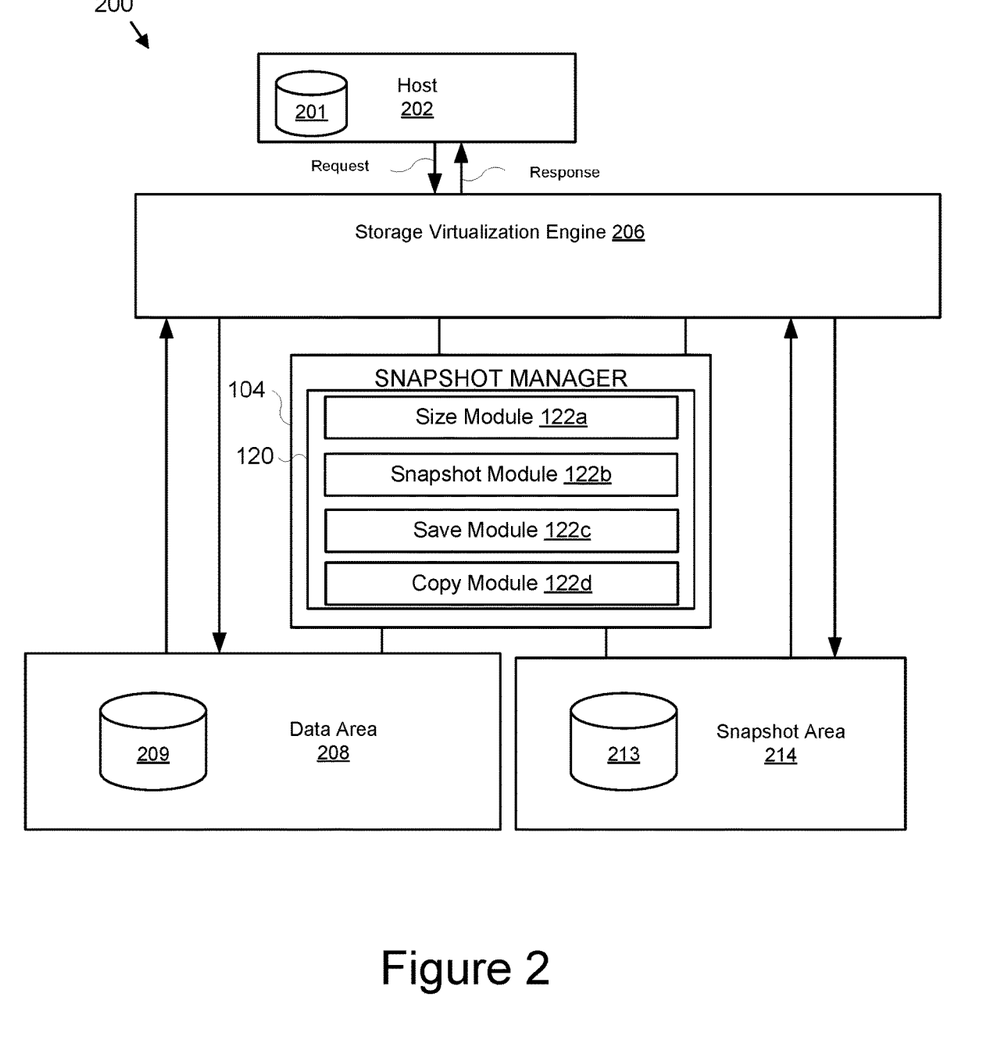
FIG. 2 is a schematic block diagram illustrating a system and an apparatus in accordance with one or more embodiments of the present invention.

Referring now to FIG. 2, a system 200 includes a host 202, a storage virtualization engine 206, a snapshot manager 104, a data area 208, and a snapshot area 214. Although the system 200 is shown and described with certain components and functionality, other embodiments of the system 200 may include fewer or more components to implement less or more functionality.

In some embodiments, an interface of a storage virtualization engine 206 is provided to a host 202 that is connected to the storage virtualization engine 206. In some embodiments, the storage virtualization engine 206 may be a disk storage product such as the storage virtualization engine 206 or similar products and services. The data written to the storage virtualization engine 206 is referred to as a virtual tape, and is managed by the file system in the storage virtualization engine 206 as a file.

In some embodiments, the storage virtualization engine 206 gives an attribute called a "private category" to the virtual tapes from which the data may be read in the future, and gives an attribute called a "scratch category" to the other virtual tapes. However, the data may be read from the virtual tape belonging to the scratch category in an emergency. For example, when data A and data B need to be written in a certain transaction, but only any one of the data A and the data B exists due to the occurrence of a disaster, the data may be read from the virtual tape that belongs to the scratch category. The data written to the virtual tape is always appended, and therefore the data is appended to the virtual tape that belongs to the private category. On the other hand, the data written to the virtual tape that belongs to the scratch category is overwritten from the beginning of the file.

In some embodiments, the storage virtualization engine 206 has a function called "Flash Copy for Disaster Recovery Testing" using the snapshot of the file system. This is a function of training recovery of customers' IT equipment when a disaster occurs. A point in time when the snapshot is created is regarded as a point in time when the disaster occurs, and the recovery can be trained using the data included in the snapshot after the disaster occurs. This function uses the snapshot, and thus the normal reading and writing of the data can be continued during training. However, the data cannot be written efficiently because of copy-on-write processing by snapshot. The similar problem also occurs even when the storage virtualization engine 206 supports the functions such as backup, remote copying and virus scanning by using the snapshot in the future. Some embodiments solve the data writing delay due to copy-on-write processing in the virtual tape device such as the storage virtualization engine 206.

The storage virtualization engine 206 is a virtual tape server that provides tape library interface to a host 202, which includes a storage system 201. Data in the storage virtualization engine 206 is called a virtual volume, and is managed as a file in a file system of the storage virtualization engine 206. The storage virtualization engine 206 has a function called Flash Copy for Disaster Recovery Testing which internally uses snapshot. When a virtual volume is updated, a host may suffer from performance degradation because of copy-on-write processing.

The storage virtualization engine 206 interacts and interfaces with the data area 208 and the snapshot area 214, which may includes storage system 209 and storage system 213, respectively. In some embodiments, the snapshot manager 104 includes a size module 122a. In some embodiments, the size module 122a is configured to set a maximum total size of data saved in a snapshot area.

In some embodiments, the snapshot manager 104 includes a snapshot module 122b. In some embodiments, the snapshot module 122b is configured to create the snapshot of a file system, including reference to a plurality of logical volumes.

In some embodiments, the snapshot manager 104 includes a save module 122c. In some embodiments, the save module 122c is configured to save at least a part of the plurality of logical volumes in the snapshot area on condition that it does not exceed the maximum total size of data saved in the snapshot area. In some embodiments, the save module 122c is configured to save at least a part of the plurality of logical volumes in the snapshot area in ascending order of size.

In some embodiments, the snapshot manager 104 includes a copy module 122d. In some embodiments, the copy module 122d is configured to execute copy-on-write processing in response to a writing request for data in the file system, the data not being saved in the snapshot area.

Some embodiments include periodically copying the data of the logical volumes existing in a scratch category in ascending order of size to the snapshot area 214. The data of the logical volumes in the scratch category is selected in ascending order of size to save the data in the snapshot area 214, and thus more data of the logical volumes can be saved in the snapshot area 214 in a shorter amount of time. Furthermore, when a mount request for the logical volumes belonging to the scratch category arises, the logical volumes whose data has already been saved in the snapshot area 214 are mounted, and thus the data writing delay due to the copy-on-write processing can be avoided. The data to be saved in the snapshot area 214 is limited, in some embodiments to the logical volumes belonging to the scratch category, and thus the required storage area can be reduced as compared with conventional art. When the logical volumes belonging to the private category are mounted, the data is appended, and therefore the copy-on-write processing is not generated, and the data saving is not required in those implementations.

Figure 3:
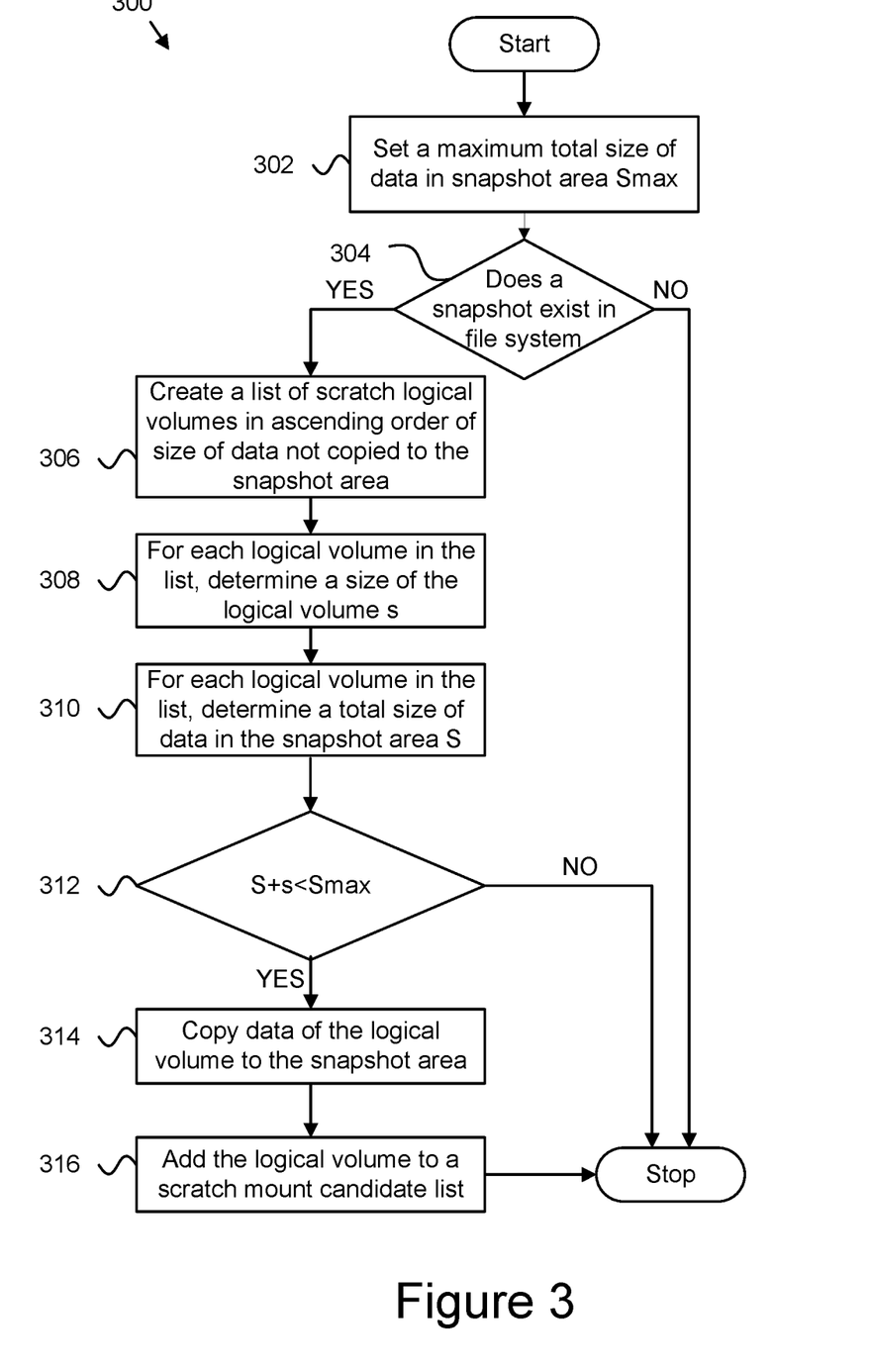
FIG. 3 is a schematic flow chart diagram illustrating one embodiment of a method in accordance with one or more embodiments of the present invention.

FIG. 3 is a schematic flow chart diagram illustrating one embodiment of a method 300 in accordance with one or more embodiments of the present invention. The method 300 begins and at 302, a maximum total size, Smax, of data to be saved in a snapshot area is set. In some embodiments, this can be set previous to executing this and the other methods described herein. At 304, it is determined whether a snapshot of a file system exists. If not, the method 300 ends. If yes, the method proceeds to 306. At 306, a list of scratch logical volumes in ascending order of size of data not copied to the snapshot area is created. At 308, for each logical volume in the list, a size of the logical volume "s" is determined.

At 310, for each logical volume in the list, a total size of data in the snapshot area "S" is determined. At 312, it is determined whether S+s<Smax. If no, the method 300 ends. If yes, at 314, data of the logical volume is copied to the snapshot area. At 316, the logical volume is added to a scratch mount candidate list. The method 300 then ends.

By saving the data of the logical volumes in the scratch category in ascending order of size in the snapshot area, the logical volumes whose large quantity of data has already been saved in the snapshot area can be prepared in a short time. Furthermore, a maximum total size of data saved in the snapshot area is set, and thus the use size of the storage in the snapshot area can be limited.

The data of the logical volumes in the scratch category is previously saved in the snapshot area in the above-described method, and thus the writing delay due to the Copy-on-write processing can be avoided and the data can be efficiently written when the data is overwritten from the head of the logical volumes by scratch mount. The logical volume belonging to the scratch category can be also read from the snapshot. The storage capacity required can be estimated at "the total size of customer's data+Smax" by applying embodiments of the present invention.

When a scratch mount request arises, one logical volume is selected from logical volumes in the scratch mount candidate list created in the above-described method, and returned to the host. When the time required to write data is represented as $t_{write}$, and the time required to read data is represented as $t_{read}$, the data writing is performed twice and the data reading is performed once when the copy-on-write processing is generated, and thus the total processing time required is $t_{read}+2t_{write}$. On the other hand, when the data is previously saved according to embodiments described herein, the time required for writing processing is merely $t_{write}$.

Figure 4:
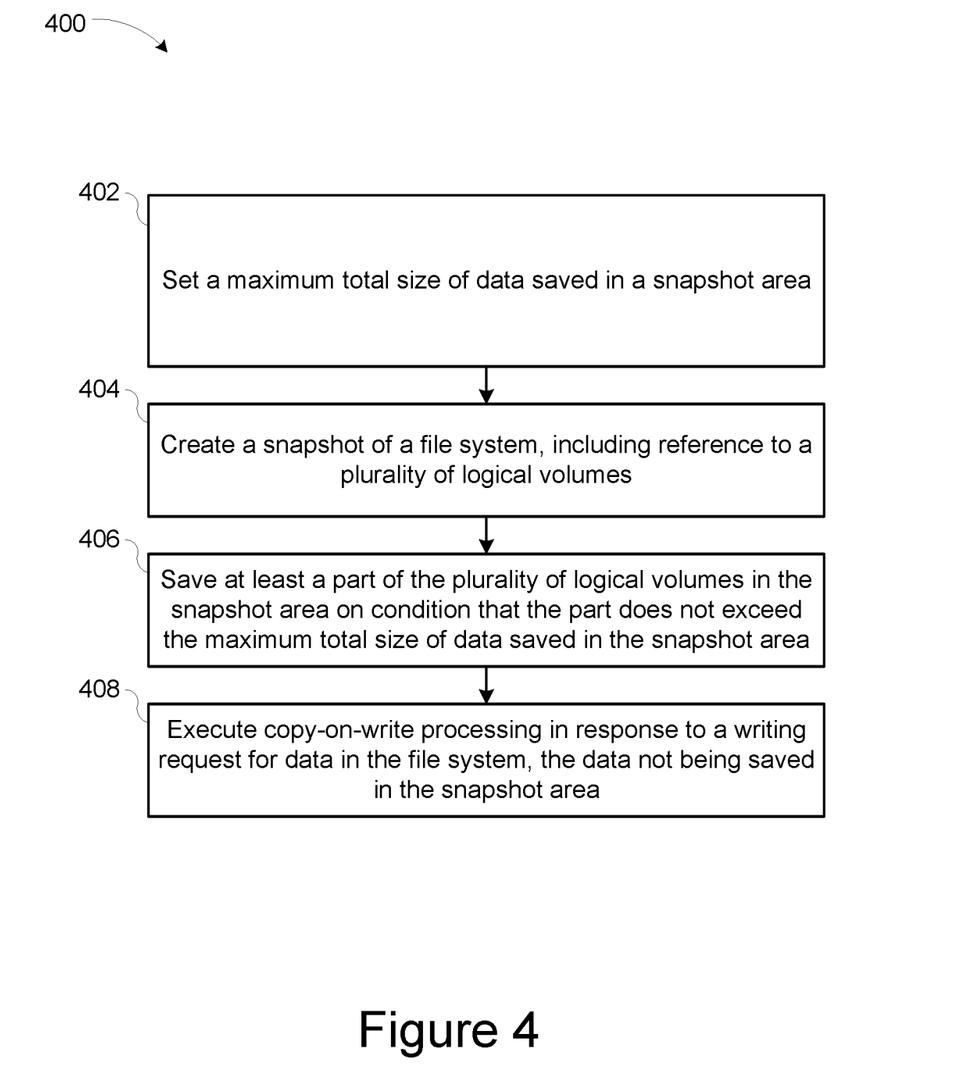
FIG. 4 is a schematic flow chart diagram illustrating one embodiment of a method in accordance with one or more embodiments of the present invention.

FIG. 4 is a schematic flow chart diagram illustrating one embodiment of a method 400 in accordance with the present invention. At block 402, the method 400 includes setting a maximum total size of data saved in a snapshot area. At block 404, the method 400 includes creating a snapshot of a file system, including reference to a plurality of logical volumes. At block 406, the method 400 includes saving at least a part of the plurality of logical volumes in the snapshot area on condition that it does not exceed the maximum total size of data saved in the snapshot area. At block 408, the method 400 includes executing copy-on-write processing in response to a writing request for data in the file system, the data not being saved in the snapshot area.

In some embodiments, the saving is executed asynchronously with the copy-on-write processing. In some embodiments, the saving is executed in units of logical volumes. In some embodiments, the saving is performed by saving the logical volumes in ascending order of size in the snapshot area. In some embodiments, the copy-on-write processing is executed in units of data blocks.

In some embodiments, the copy-on-write processing is executed to one or more data blocks corresponding to target data of the writing request. In some embodiments, the plurality of logical volumes includes one or more virtual tapes that belong to a private category and one or more virtual tapes that belong to a scratch category. In some embodiments, data is appended to the virtual tape that belongs to the private category, and wherein data is overwritten from the beginning of a file on the virtual tape that belongs to the scratch category.

Figure 5:
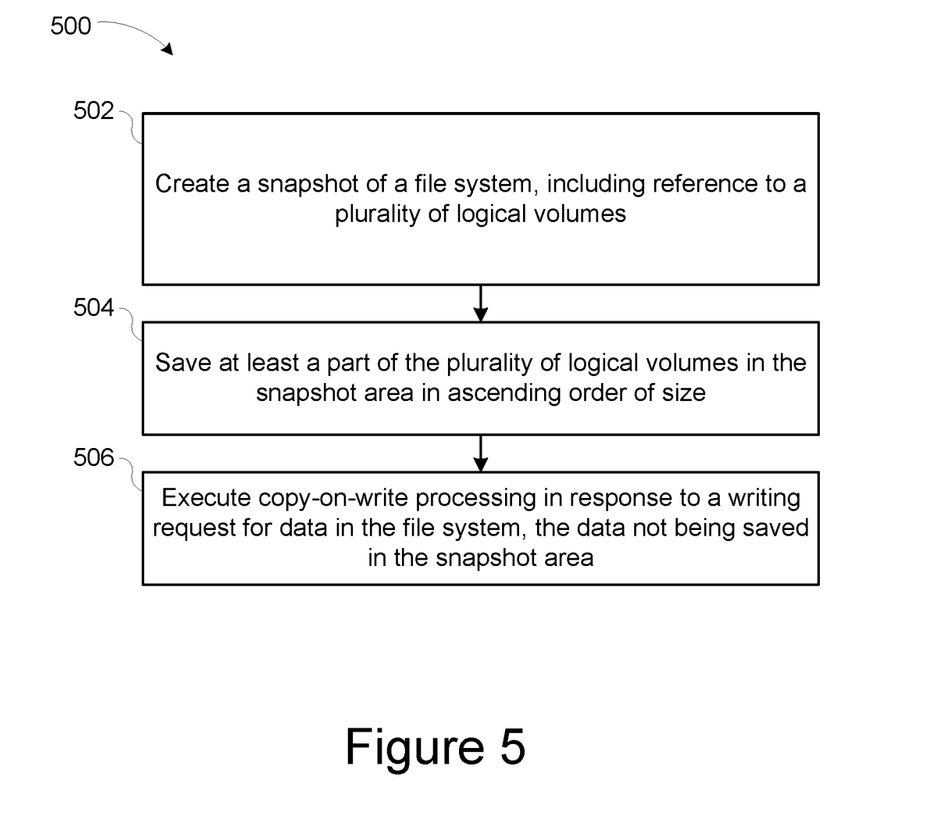
FIG. 5 is a schematic flow chart diagram illustrating another embodiment of a method in accordance with one or more embodiments of the present invention.

FIG. 5 is a schematic flow chart diagram illustrating one embodiment of a method 500 in accordance with the present invention. The method 500 begins and at 502, the method 500 includes creating a snapshot of a file system, including reference to a plurality of logical volumes. At block 504, the method 500 includes saving at least a part of the plurality of logical volumes in the snapshot area in ascending order of size. At block 506, the method 500 includes executing copy-on-write processing in response to a writing request for data in the file system, the data not being saved in the snapshot area.

In some embodiments, the method further includes setting a maximum total size of data saved in a snapshot area. In some embodiments, the method further includes saving at least a part of the plurality of logical volumes in the snapshot area on condition that it does not exceed the maximum total size of data saved in the snapshot area. In some embodiments, the saving is executed asynchronously with the copy-on-write processing. In some embodiments, the saving is executed in units of logical volumes. In some embodiments, the copy-on-write processing is executed in units of data blocks. In some embodiments, the copy-on-write processing is executed to one or more data blocks corresponding to target data of the writing request.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    setting a maximum total size of data saved in a snapshot area;
    creating a snapshot of a file system, the snapshot including reference to a plurality of logical volumes of the file system;
    saving a first portion of data in the plurality of logical volumes to the snapshot area on condition that the first portion of the data in the plurality of logical volumes does not exceed the maximum total size of data saved in the snapshot area;
    maintaining a remaining portion of the data in the plurality of logical volumes;
    mounting first data in the first portion of the data in the plurality of logical volumes saved to the snapshot area without performing a copy-on-write request in response to receiving a first mounting request;
    in response to receiving a second mounting request for second data in the remaining portion of the data in the plurality of logical volumes:
        appending the second data in the remaining portion of the data in the plurality of logical volumes, and
        mounting the appended second data without performing a copy-on-write request; and
    executing a copy-on-write process for the remaining portion of data in the plurality of logical volumes in response to a write request to write the remaining portion of the data in the plurality of logical volumes to the snapshot area that exceeds the maximum total size of data saved in the snapshot area,
    wherein saving the first portion of the data in the plurality of logical volumes to the snapshot area precludes execution of the copy-on-write process on the first portion of the data in the plurality of logical volumes to avoid a processing delay due to performing the copy-on-write process on the first portion of the data in the plurality of logical volumes.

2. The method of claim 1, wherein the saving is executed asynchronously with the copy-on-write process.

3. The method of claim 1, wherein the saving is executed in units of logical volumes.

4. The method of claim 3, wherein the saving is performed by saving the logical volumes in ascending order of size in the snapshot area.

5. The method of claim 3, wherein the copy-on-write process is executed in units of data blocks.

6. The method of claim 5, wherein the copy-on-write process is executed on one or more data blocks corresponding to target data of the writing request.

7. The method of claim 1, wherein the plurality of logical volumes include one or more virtual tapes that belong to a private category and one or more virtual tapes that belong to a scratch category.

8. The method of claim 7, wherein the saving includes saving only one or more logical volumes that belong to the scratch category in the snapshot area.

9. The method of claim 7, wherein:
appending the second data comprises appending the second data to the virtual tape that belongs to the private category; and
data is overwritten from the beginning of a file on the virtual tape that belongs to the scratch category.

10. A computer program product comprising a non-transitory computer-readable storage medium including program instructions embodied therewith,
the program instructions executable by a processor to cause the processor to:
set a maximum total size of data saved in a snapshot area;
create the snapshot of a file system, the snapshot including reference to a plurality of logical volumes of the file system;
save a first portion of data in the plurality of logical volumes to the snapshot area on condition that the first portion of the data in the plurality of logical volumes does not exceed the maximum total size of data saved in the snapshot area;
maintain a remaining portion of the data in the plurality of logical volumes;
mount first data in the first portion of the data in the plurality of logical volumes saved to the snapshot area without performing a copy-on-write request in response to receiving a first mounting request;
in response to receiving a second mounting request for second data in the remaining portion of the data in the plurality of logical volumes:
append the second data in the remaining portion of the data in the plurality of logical volumes, and mount the appended second data without performing a copy-on-write request; and
execute a copy-on-write process for the remaining portion of data in the plurality of logical volumes in response to a write request to write the remaining portion of the data in the plurality of logical volumes to the snapshot area that exceeds the maximum total size of data saved in the snapshot area,
wherein saving the first portion of the data in the plurality of logical volumes to the snapshot area precludes execution of the copy-on-write process on the first portion of the data in the plurality of logical volumes to avoid a processing delay due to performing the copy-on-write process on the first portion of the data in the plurality of logical volumes.

11. The computer program product of claim 10, wherein the saving is executed asynchronously with the copy-on-write process.

12. The computer program product of claim 10, wherein the saving is performed by saving the logical volumes in ascending order of size in the snapshot area.

13. The computer program product of claim 10, wherein:
the plurality of logical volumes include one or more virtual tapes that belong to a private category;
one or more virtual tapes that belong to a scratch category;
appending the second data comprises appending the second data to the virtual tape that belongs to the private category; and
data is overwritten from the beginning of a file on the virtual tape that belongs to the scratch category.

14. An apparatus, comprising:
a size module that sets a maximum total size of data saved in a snapshot area;
a snapshot module that creates a snapshot of a file system, the snapshot including reference to a plurality of logical volumes of the file system;
a save module that saves a first portion of data in the plurality of logical volumes to the snapshot area on condition that the first portion of the data in the plurality of logical volumes does not exceed the maximum total size of data saved in the snapshot area; and
a copy module that:
executes a copy-on-write process for a remaining portion of data in the plurality of logical volumes in response to a write request to write the remaining portion of the data in the plurality of logical volumes to the snapshot area that exceeds the maximum total size of data saved in the snapshot area,
maintains a remaining portion of the data in the plurality of logical volumes,
mounts first data in the first portion of the data in the plurality of logical volumes saved to the snapshot area without performing a copy-on-write request in response to receiving a first mounting request,
in response to receiving a second mounting request for second data in the remaining portion of the data in the plurality of logical volumes:
appends the second data in the remaining portion of the data in the plurality of logical volumes, and
mounts the appended second data without performing a copy-on-write request,
wherein:
saving the first portion of the data in the plurality of logical volumes to the snapshot area precludes execution of the copy-on-write process on the first portion of the data in the plurality of logical volumes to avoid a processing delay due to performing the copy-on-write process on the first portion of the data in the plurality of logical volumes, and
at least a portion of each of the size module, the snapshot module, the save module, and the copy module comprises one or more of a set of hardware circuits, a set of programmable hardware devices, and executable code stored on a set of non-transitory computer-readable storage media.

15. The apparatus of claim 14, wherein the saving is executed asynchronously with the copy-on-write process.

16. The apparatus of claim 14, wherein the saving is executed in units of logical volumes.

17. The apparatus of claim 16, wherein:
the saving is performed by saving the logical volumes in ascending order of size in the snapshot area; and
the copy-on-write process is executed in units of data blocks.

18. The apparatus of claim 17, wherein the copy-on-write process is executed on one or more data blocks corresponding to target data of the writing request.

19. The apparatus of claim 14, wherein the plurality of logical volumes include one or more virtual tapes that belong to a private category and one or more virtual tapes that belong to a scratch category.

20. The apparatus of claim 19, wherein:
the saving includes saving only one or more logical volumes that belong to the scratch category in the snapshot area;
appending the second data comprises appending the second data to the virtual tape that belongs to the private category; and
data is overwritten from the beginning of a file on the virtual tape that belongs to the scratch category.

\* \* \* \* \*